(12) United States Patent
Harris et al.

(10) Patent No.: US 6,254,345 B1
(45) Date of Patent: Jul. 3, 2001

(54) INTERNALLY COOLED BLADE TIP SHROUD

(75) Inventors: Daniel J. Harris; Robert A. Frederick, both of West Chester; Lawrence P. Timko, Fairfield, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/390,993

(22) Filed: Sep. 7, 1999

(51) Int. Cl.[7] ........................................................ F01D 5/18
(52) U.S. Cl. ........................................... 416/96; 416/189
(58) Field of Search ..................................... 415/115, 116, 415/173.5, 173.4, 173.6; 416/189, 190, 191, 192, 96 RR, 96 A

(56) References Cited

U.S. PATENT DOCUMENTS

| 3,527,544 | * | 9/1970 | Allen ................................... 416/96 R |
| 4,214,851 | * | 7/1980 | Tuley et al. ........................... 415/115 |
| 4,522,557 | * | 6/1985 | Bouiller et al. ....................... 415/116 |
| 5,064,343 | * | 11/1991 | Mills .................................... 415/115 |
| 5,941,687 | * | 8/1999 | Tubbs .................................. 416/97 R |

* cited by examiner

Primary Examiner—Edward K. Look
Assistant Examiner—James M. McAleenan
(74) Attorney, Agent, or Firm—Andrew C. Hess; Rodney M. Young

(57) ABSTRACT

A gas turbine engine turbine blade shrouded tip has an airfoil tip with a cross-sectional airfoil shape, a blade tip shroud attached to the tip, and a shroud cooling circuit disposed within the blade tip shroud. The shroud cooling circuit is operable for cooling substantially all of the shroud and is in fluid communication with a hollow interior of the tip. One embodiment of the invention includes two circumferentially extending forward and aft seal teeth on a radially outer shroud surface of the shroud extending in a radial direction away from the hollow interior of the tip. The shroud cooling circuit includes circumferentially extending shroud cooling passages between clockwise and counter-clockwise shroud side edges of the shroud. Forward and aft pluralities of the shroud cooling passages within the tip shroud are in fluid communication with first and second cavities respectively in the hollow interior.

22 Claims, 7 Drawing Sheets

INTERNALLY COOLED BLADE TIP SHROUD

BACKGROUND OF THE INVENTION

1. Field of the Invention

This invention relates to aircraft gas turbine engine turbine blade tip shrouds and seals and, more particularly, to cooling the shroud and tip.

2. Discussion of the Background Art

Gas turbine engines frequently employ tip shrouds on individual airfoils to limit blade amplitudes when vibrating in a random manner and to guide fluid flow over the airfoils. This is particularly true in the low pressure section of a gas turbine engine. Neighboring shrouds abut in the circumferential direction to add mechanical stiffness. When a series of such assemblies are mounted together, the shrouds define in effect a continuous annular surface. Circumferentially opposite edges of the shrouds in the circumferential direction are provided with abutment faces and are designed to introduce to the assembly desired constraints.

Circumferentially extending seal teeth extend radially outwardly from the shrouds to engage seal lands to seal the gas flowpath between the shrouds and casing surrounding the rotor. The seal lands typically are in the form of a honeycomb covered stator shroud.

Gas turbine engines typically include cooling systems which provide cooling air to turbine rotor components, such as turbine blades, in order to limit the material temperatures experienced by such components. Prior art cooling systems usually acquire the air used to cool turbine components from the engine's compressor, after which it is diverted and subsequently directed to the turbine section of the engine through an axial passageway.

Low pressure turbine blades typically are not cooled. High pressure turbine blades which are typically cooled do not have deflection restraining tip shrouds. Supersonic high performance engines are being developed for long distance supersonic operation, such as for the High Speed Commercial Transport (HSCT) engine program. The low pressure turbine blades in the low pressure turbine section are exposed to high temperatures for long periods of time over most of the flight envelope with the engine operating at high power engine settings. It is also desirable to have a low engine weight and engine length.

High speed engines require better cooling techniques than those presently used. One exemplary engine for a high speed civil transport employs a low pressure turbine in close proximity to a high pressure turbine discharge. Furthermore, the engines mission requires long term exposure of the low pressure turbine to very high temperatures at high power engine settings. Aircraft gas turbine engine designers constantly strive to improve the efficiency of the gas turbine engine as well designing an engine which is low weight and short. The use of cooling air increases fuel consumption and, therefore, it is highly desirable to minimize the amount of engine work used to produce the cooling air.

SUMMARY OF INVENTION

A gas turbine engine turbine blade shrouded tip includes an airfoil tip having a cross-sectional airfoil shape, a blade tip shroud attached to the tip, and a shroud cooling circuit disposed within the blade tip shroud. The shroud cooling circuit is operable for cooling substantially all of the shroud and is in fluid communication with a hollow interior of the tip.

In one embodiment of the invention, the tip shroud has at least one circumferentially extending seal tooth on a radially outer shroud surface of the shroud extending in a radial direction away from the hollow interior. Preferably, two or more such seal teeth are employed. In a more particular embodiment of the invention, the tip shroud further includes circumferentially extending and axially spaced apart leading and trailing shroud edges, circumferentially spaced apart clockwise and counter-clockwise shroud side edges. The shroud cooling circuit includes circumferentially extending shroud cooling passages between the clockwise and counter-clockwise shroud side edges. One more particular embodiment of the invention provides forward and aft pluralities of the shroud cooling passages within the tip shroud and in fluid communication with first and second cavities respectively in the hollow interior.

In another embodiment of the invention, a blade having an airfoil with the tip shroud at a tip of the airfoil includes an airfoil cooling circuit in fluid communication with the shroud cooling circuit. In a more particular embodiment of the invention, the blade further includes forward and aft pluralities of the shroud cooling passages in fluid communication with first and second cavities respectively of the airfoil cooling circuit. The airfoil, in a more particular embodiment, has an aspect ratio of at least about 3.

A gas turbine engine turbine assembly includes a plurality of such turbine blades mounted around a periphery of a turbine rotor. The blades have airfoils extending radially outward from blade platforms to tip shrouds at airfoil tips having airfoil shapes and mounted to the rotor by roots extending radially inward from the blade platforms. The hollow interiors of the blades are in fluid communication with rotor cooling passages through the rotor. Typically, each of the hollow interiors includes one of the airfoil cooling circuits in fluid communication with the shroud cooling circuit. An annular sealing assembly is mounted to and within an engine casing and spaced radially apart from the seal teeth so as to provide a gas path seal with the seal teeth. The annular sealing assembly includes a shroud stator supporting a honeycomb material mounted to a radially inwardly facing side of the shroud stator such that the honeycomb material cooperates with the seal teeth to provide the gas path seal.

Apparatus for impingement cooling is used in one embodiment for directing impingement cooling air onto a radially outwardly facing side of the shroud stator. Such apparatus includes, in a more specific embodiment, an external teeth cooling assembly for flowing the impingement cooling air into the flowpath and around the seal teeth after it has impinged the radially outwardly facing side of the shroud stator. One external teeth cooling assembly includes a leakage path between a forward edge of the shroud stator and a support hanger which supports the shroud stator from the engine casing.

ADVANTAGES OF THE INVENTION

The internally cooled tip shroud helps the gas turbine engine to operate at a long period of time at high power engine settings with low pressure turbine blades exposed to very high temperature gas flows. The invention also allows placing the low pressure turbine blades in close proximity to the high pressure turbine discharge and, particularly, in engine designs having counter-rotating high and low pressure turbine rotors with no stators therebetween. Among the benefits of the present invention are lower engine weight and reduced engine length.

The present invention provides efficient cooling to obtain sufficient creep and oxidation component lives for the sustained high power conditions. The invention provides cooling and reduced metal temperatures of the turbine blade tip shroud to levels which allows creep and oxidation life goals to be met. The cooled tip shroud is advantageous because it allows reduction of turbine blade weight and axial length by allowing a more slender blade (higher aspect ratio) to meet vibration frequency requirements. This results from the additional support rendered by the blade to blade constraining effect of the tip shroud, which raises blade frequencies to meet design requirements.

BRIEF DESCRIPTION OF THE DRAWINGS

The novel features believed characteristic of the present invention are set forth and differentiated in the claims. The invention, together with further objects and advantages thereof, is more particularly described in conjunction with the accomyanying drawings in which:

DETAILED DESCRIPTION

Figure 1:
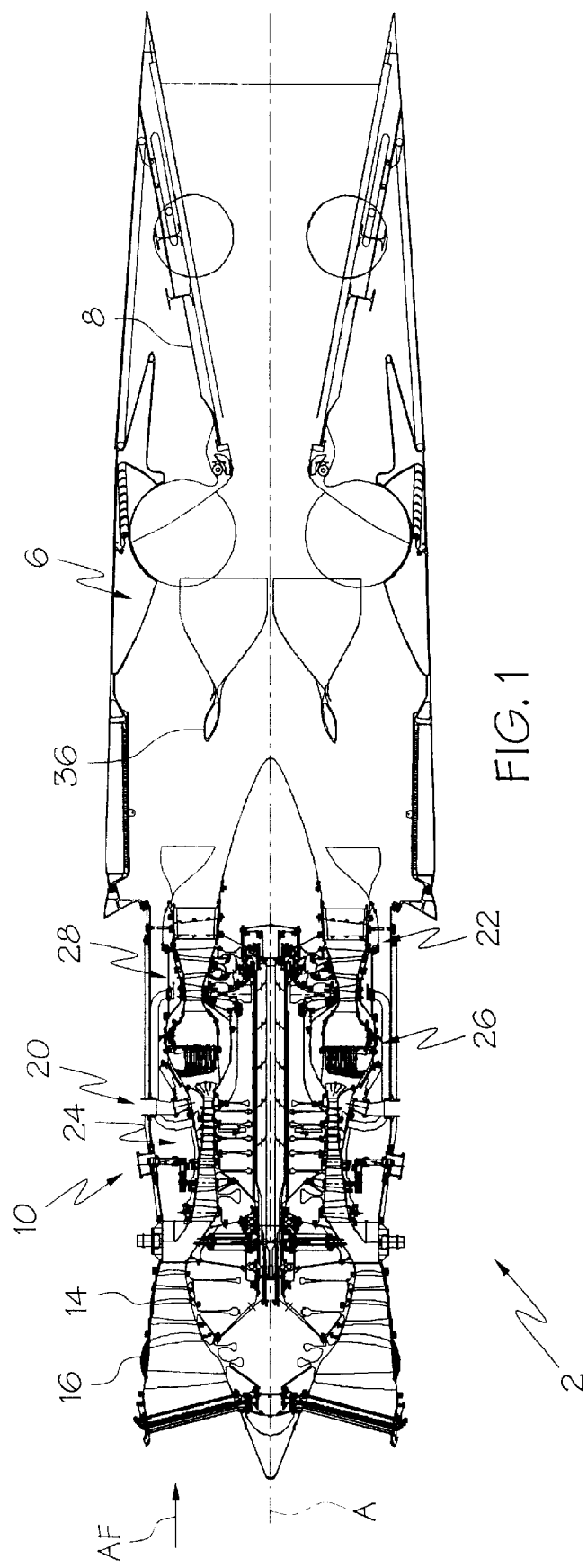
FIG. 1 is a schematic cross-sectional view illustration of a gas turbine engine illustrating one exemplary embodiment of an internally cooled turbine blade shroud of the present invention.
Figure 2:
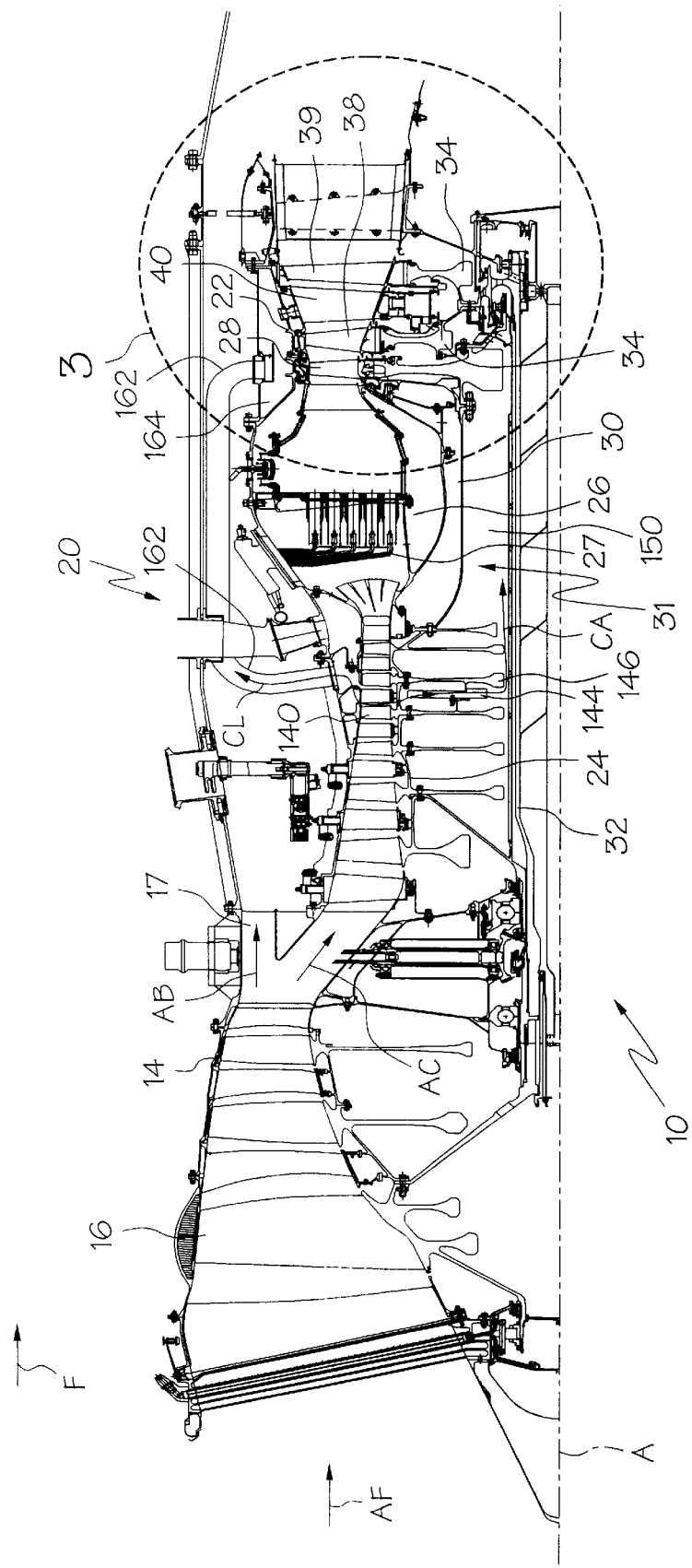
FIG. 2 is an expanded view illustration of a gas generator in the engine in FIG. 1.

Illustrated in FIGS. 1 and 2 is a supersonic aircraft gas turbine engine, generally designated 2, having a gas generator 10 and an exhaust section 6 with a variable 2-D nozzle 8. The gas generator 10 has a longitudinal centerline A and an annular engine casing 14 disposed coaxially and concentrically about the centerline A. Air AF enters the gas generator 10 in a downstream axial direction F through a multistage fan 16 and is then split into fan bypass air AB directed through a fan bypass 17 and core air AC directed through a core engine 20. The core engine 20 includes a multi-stage high pressure compressor 24, an annular combustor 26, with fuel injectors 27, and a single stage high pressure turbine 28, all arranged coaxially about the centerline A of the gas generator 10 in a serial flow relationship. A high pressure shaft 30 of a high pressure rotor 31 fixedly interconnects the high pressure compressor 24 and high pressure turbine 28 of the core engine 20. The high pressure compressor 24 is rotatably driven by the single stage high pressure turbine 28 to compress air entering the core engine 20 to a relatively high pressure. This high pressure air is then mixed with fuel in the combustor 26 and ignited to form a high energy gas stream. This gas stream flows aft and passes through the high pressure turbine 28, rotatably driving it and the high pressure shaft 30 of the core engine 20 which, in turn, rotatably drives the multi-stage high pressure compressor 24.

The gas stream discharged by the core engine high pressure turbine 28 is expanded through a dual stage low pressure turbine 22 (LPT) which is designed to counter-rotate with respect to the high pressure turbine 28. Note, that there are no stators between the high pressure turbine 28 and low pressure turbine 22 because they counter-rotate with respect to each other during engine operation. The low pressure turbine 22 drives the fan 16 via a low pressure shaft 32 which extends forwardly through the annular high pressure shaft 30. The high pressure and high temperature gases produced by the core engine after it passes through the low pressure turbine 22 is mixed with the bypass air AB in the exhaust section 6 by a variable mixer 36. The nozzle 8 receives the mixed core and bypass stream gases and produces thrust for the engine 2.

Figure 3:
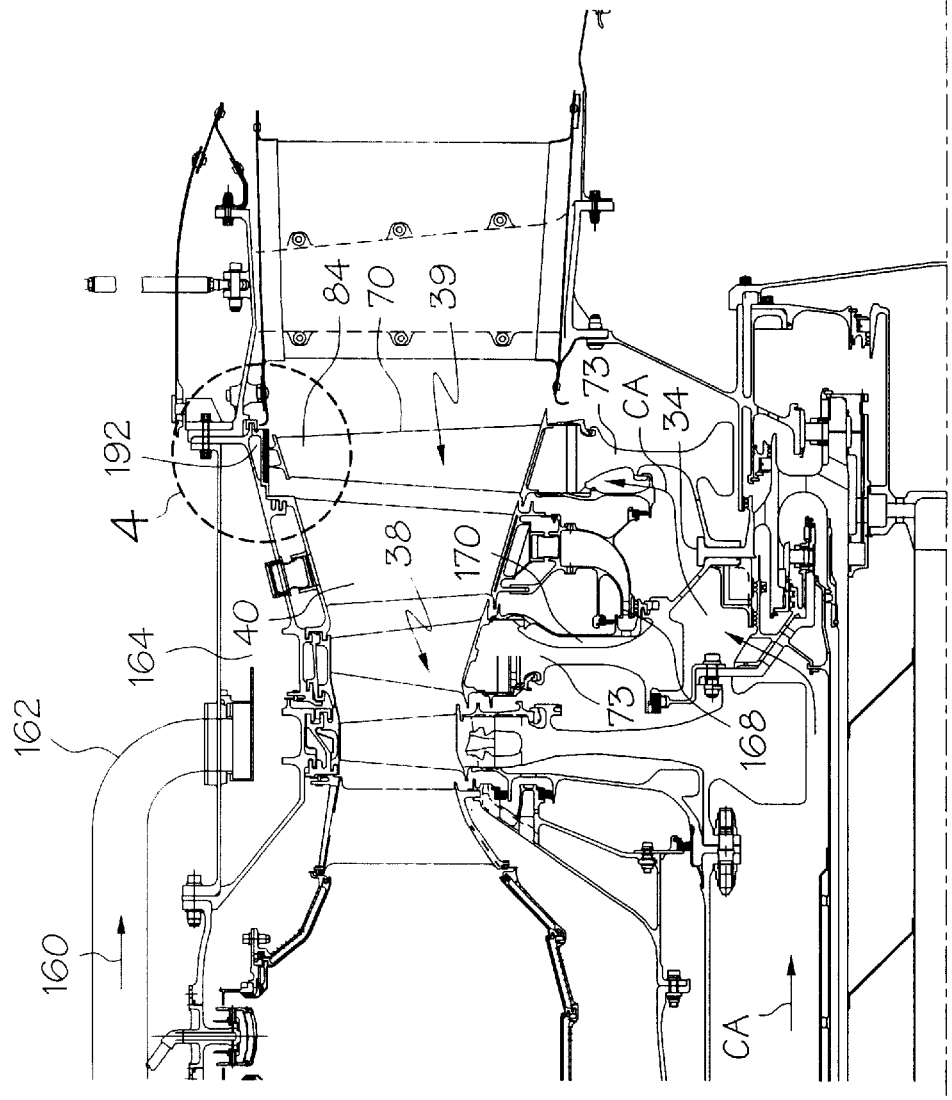
FIG. 3 is an expanded view illustration of a turbine section in gas generator in FIG. 2.

Further referring to FIG. 3, the two stage low pressure turbine 22 includes an annular rotatable low pressure turbine rotor 34 having a first row 38 of first turbine blades and a second row 39 of second turbine blades extending radially outwardly from the low pressure turbine rotor and axially spaced apart from one another. A row of LPT stator vanes 40 are fixedly attached to and extend radially inwardly from the relatively stationary engine casing 14 between the first row 38 of first turbine blades and the second row 39 of second turbine blades.

Figure 5:
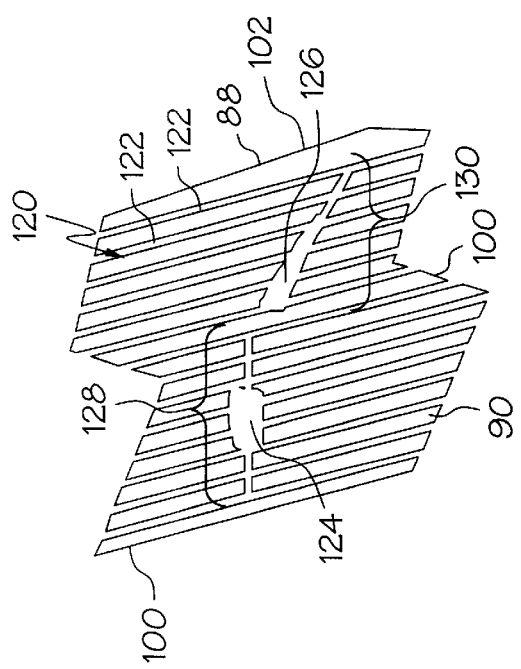
FIG. 5 is a schematic top view illustration of the turbine shroud taken through line 5—5 of the turbine blade tip in FIG. 4.

The present invention is designed for use in the low pressure turbine and is exemplified herein for a second stage low pressure turbine blade 70 in the second row 39 of first turbine blades. The low pressure turbine blade 70, more specifically illustrated in FIGS. 5, 6, and 7, has an airfoil 72 with a pressure side 74 and a suction side 76, and a base 78 mounting the airfoil 72 to a disk 73 (FIG. 3) of the low pressure rotor 34 settings 3. The airfoil 72 extends downstream aftwardly from an airfoil leading edge LE to and airfoil trailing edge TE. The base 78 has a platform 80 rigidly mounting the airfoil 72 and a dovetail root 82 for attaching the blade 70 to the disk 73. The airfoil 72 has an outer wall 60 surrounding a hollow interior 62 containing an airfoil cooling circuit 81 therein for flowing cooling air through the airfoil and cooling the airfoil both internally and externally with film cooling holes as is well known in the art.

Figure 6:
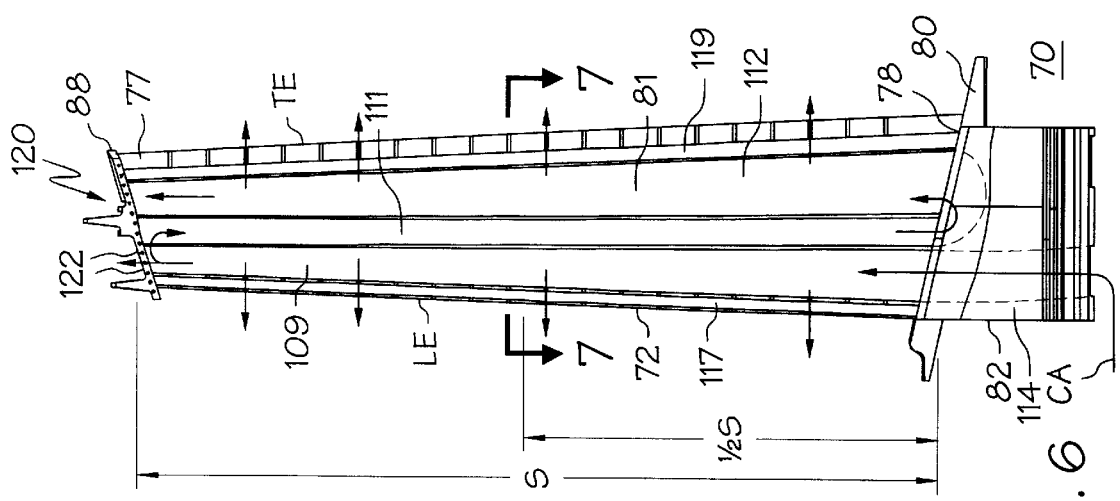
FIG. 6 is a schematic cross-sectional view illustration of a low pressure turbine blade the turbine section in FIG. 3.
Figure 7:
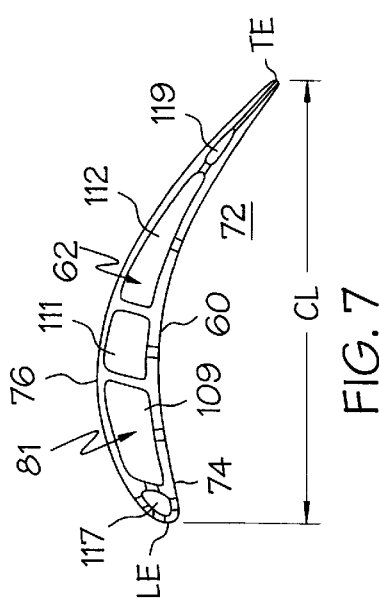
FIG. 7 is a schematic cross-sectional view illustration of an airfoil of the low pressure turbine blade in FIG. 6.

As illustrated in FIGS. 6 and 7, the cooling circuit 81 is illustrated as a three pass circuit having forward, mid, and aft cavities 109, 111, and 112, respectively, arranged in serial fluid communication. Forward and aft cavities 109 and 112, respectively, provide edge cooling air 114 to the leading and trailing edges LE and TE, respectively, through leading and trailing edge cavities 117 and 119, respectively. An outer end portion 84 (FIG. 3) of the airfoil 72 has a blade tip 77 with a cross-sectional airfoil shape and a tip shroud 88. Note that the airfoil has a span S that is substantially greater than its mid-spin chord length CL, measured at half the span length ½S, and very small degree of taper from the base 78 to the tip 77. The airfoils 72 of the present invention may be made very narrow with aspect ratios of about at least 3.

Figure 4:
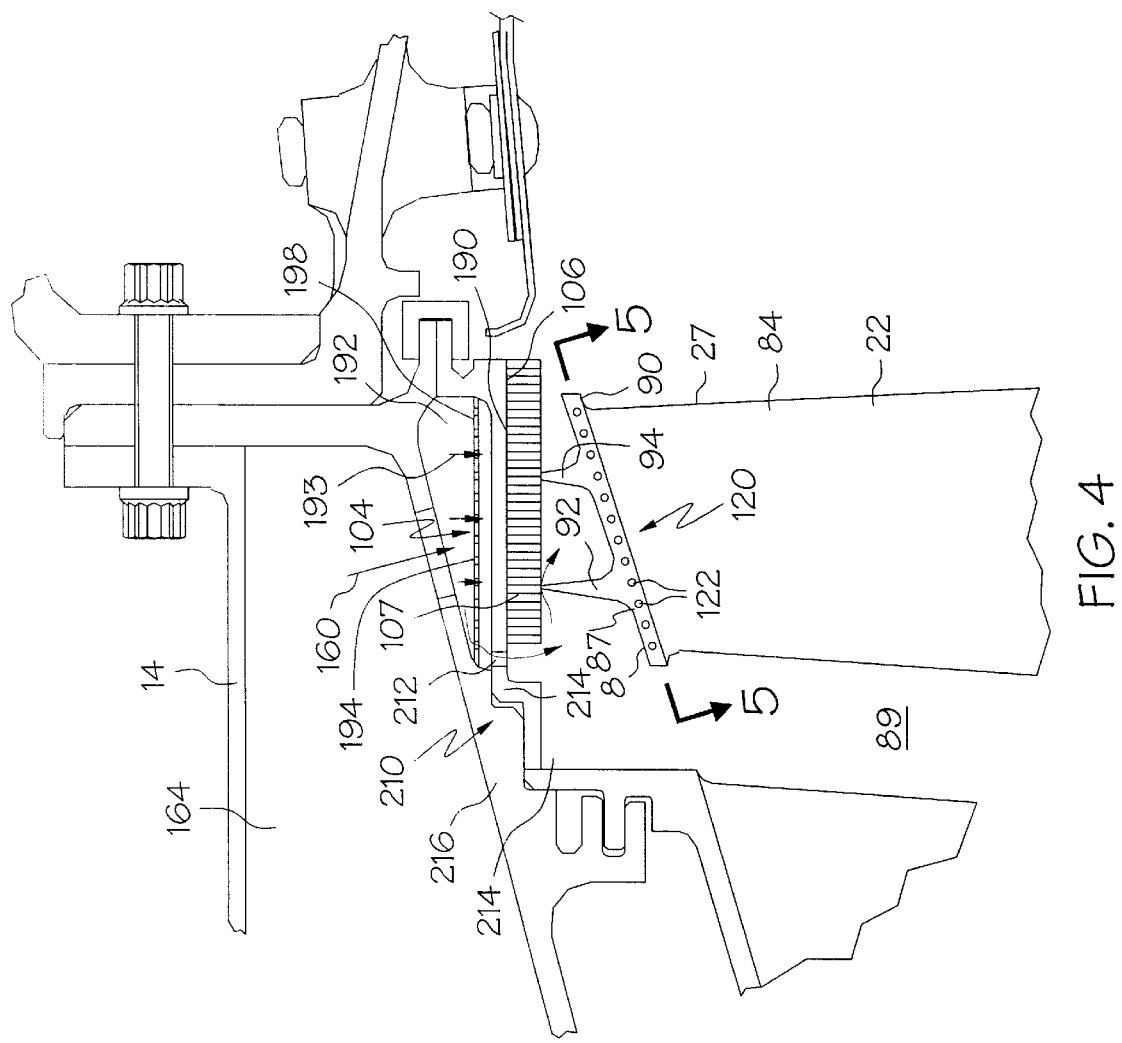
FIG. 4 is an expanded view illustration of a low pressure turbine blade tip and seal the turbine section in FIG. 3.
Figure 8:
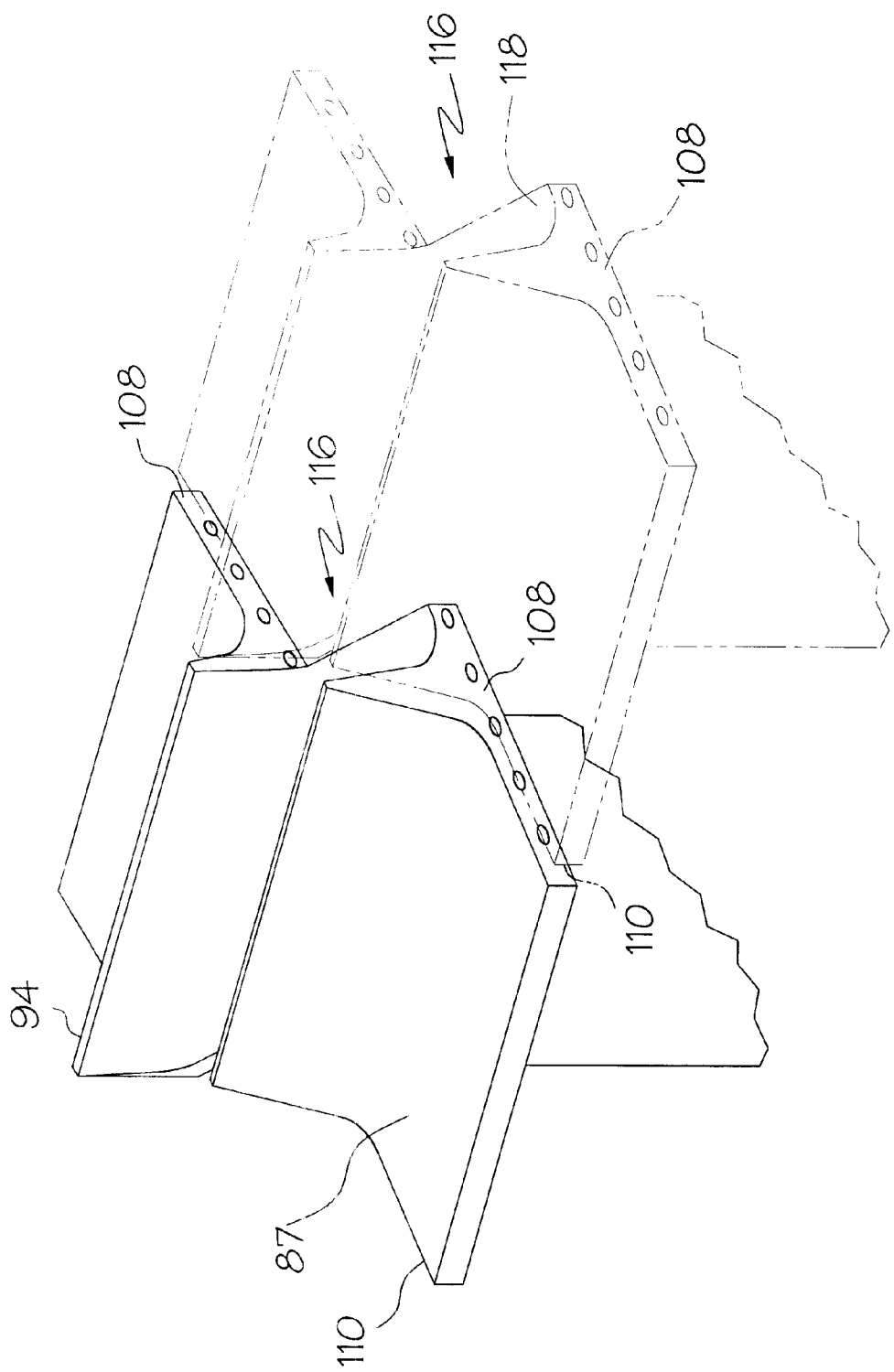
FIG. 8 is a perspective view illustration of the turbine shroud and tip turbine blade tip in FIG. 4.

Referring to FIGS. 4 and 8, the tip shroud 88 has radially inwardly facing tip shroud surfaces 90 which define a portion of the outer boundary of a turbine gas flowpath 89 (FIG. 4) for guiding the flow of hot gases therethrough. A pair of forward and aft seal teeth 92 and 94 respectively extend radially outwardly from and circumferentially along a radially outer shroud surface 87 of the tip shroud 88. The tip shrouds 88 include circumferentially extending and axially spaced apart leading and trailing shroud edges 100 and 102, respectively, and circumferentially spaced apart clockwise and counter-clockwise facing shroud side edges 108 and 110, respectively. Circumferentially adjacent ones of the clockwise and counter-clockwise facing shroud side edges 108 and 110, respectively, have interlocking mutually abutting saw teeth shapes 116, illustrated with two saw teeth 118 on each of the clockwise and counterclockwise facing shroud side edges. Circumferentially adjacent ones of the forward and aft seal teeth 92 and 94, respectively, of adjacent ones of the low pressure turbine blades 70 are mutually abutting as illustrated in FIG. 8.

Referring to FIGS. 4, 5, 6, and 7, an internal shroud cooling circuit 120 is disposed within the tip shroud 88. The shroud cooling circuit 120 is operable for cooling substantially all of the shroud and is in fluid communication with the airfoil cooling circuit 81 in the hollow interior of the airfoil and the blade tip 77. The embodiment of the shroud cooling circuit 120 disclosed herein includes circumferentially extending shroud cooling passages 122 between the clockwise and counter-clockwise shroud side edges 108 and 110, respectively.

The shroud cooling passages 122 are supplied with cooling air through forward and aft ports 124 and 126, respectively, in the tip shroud 88 leading to corresponding ones of the forward and aft cavities 109 and 112, respectively. The forward and aft ports 124 and 126, respectively, are circumferentially centrally located in the tip shroud 88 and the shroud cooling passages 122 circumferentially extend from the forward and aft ports in the clockwise and counter-clockwise direction to corresponding ones of the clockwise and counter-clockwise shroud side edges 108 and 110, respectively. This helps evenly cool the tip 77 in the clockwise and counter-clockwise direction.

Preferably, forward and aft pluralities 128 and 130, respectively, of the shroud cooling passages 122 are correspondingly in fluid communication with and supplied with cooling air by the forward and aft cavities 109 and 112, respectively, through the forward and aft ports 124 and 126, respectively. This helps tailor the cooling air pressure differential in the axial direction along the blade tip 77. The cooling air in the shroud cooling passages 122 are discharged in between the circumferentially adjacent ones of the clockwise and counter-clockwise facing shroud side edges 108 and 110, respectively, thereby cooling this area of the tip shroud 88 which further helps cool the shroud and the shroud side edges.

Cooling air may be supplied to the airfoil cooling circuit 81 in a variety of well known techniques known to those skilled in the art. Typically, the air is supplied to the forward cavity 109, which is the first cavity of the airfoil cooling circuit 81, through the dovetail root 82 of the blade 70 as illustrated in FIG. 6. The embodiment of the invention illustrated in FIGS. 2 and 3 illustrate the cooling air CA being ducted from a fourth stage 140 of the high pressure compressor 24 by a centrifugal pump 144 mounted on a fifth stage disk 146 of the high pressure rotor 31 through an annular engine cavity 150 between the high pressure rotor and the low pressure turbine rotor 34. From the annular engine cavity 150, the cooling air CA is ducted to the forward cavity 109 through the dovetail root 82 of the blade 70 as illustrated in FIG. 6.

Figure 9:
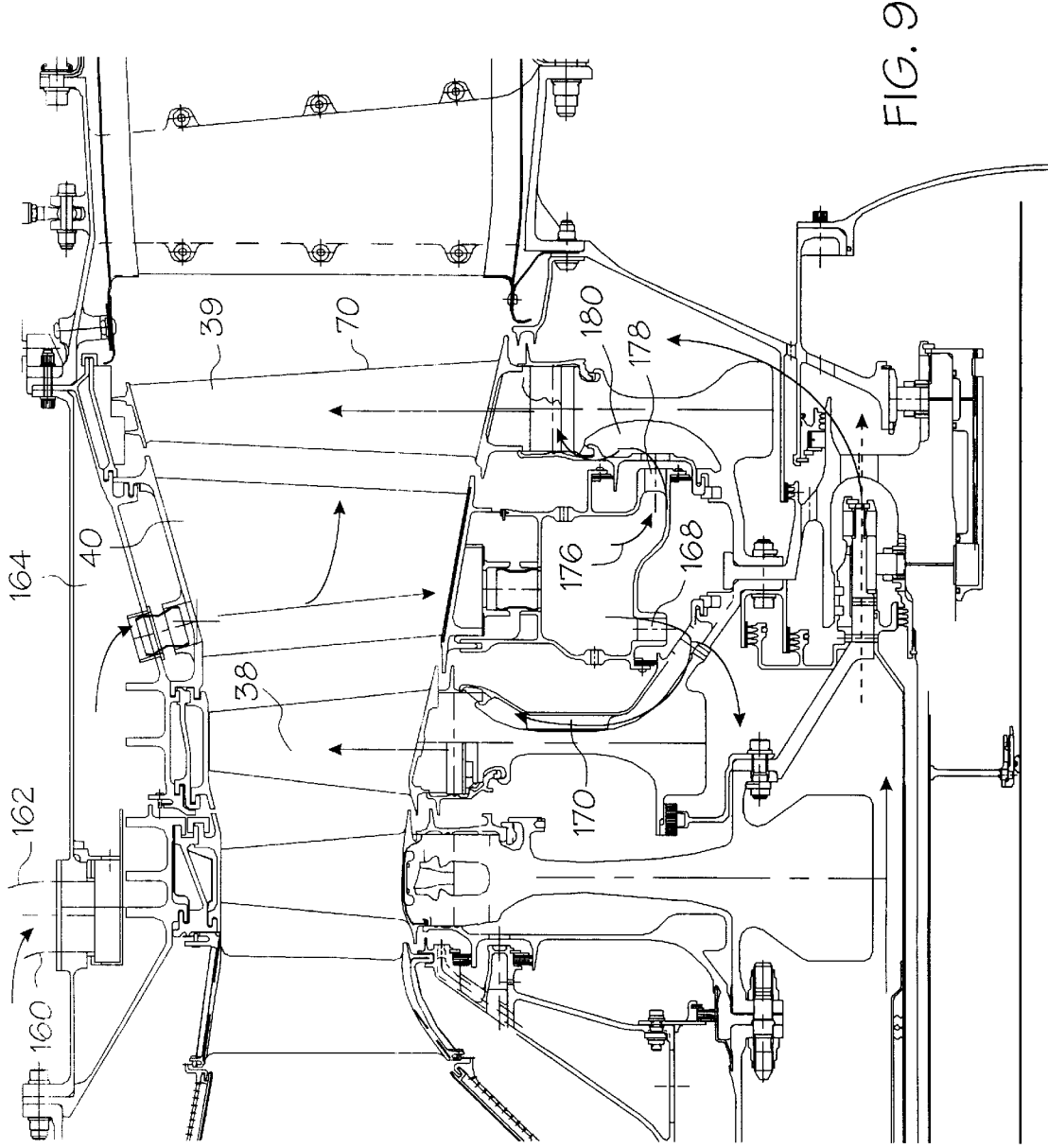
FIG. 9 is an expanded view illustration of an alternative to the turbine section in the gas generator in FIG. 3.

Fourth stage bleed air 160 from the fourth stage 140 of the high pressure compressor 24 is piped through a bleed pipe 162 to a cooling plenum 164 as illustrated in FIGS. 2 and 3. The bleed air 160 is then ducted through the row of LPT stator vanes 40 to a first set of tangential flow inducers 168 and pumped into a first disk cooling cavity 170 of the low pressure turbine 22. This bleed air 160 is used to cool the first row of first turbine blades. An alternative embodiment of the invention is illustrated in FIG. 9 wherein a portion 176 of the bleed air 160 is ducted to a second set of tangential flow inducers 178 and pumped into a second disk cooling cavity 180 of the low pressure turbine 22 which leads to the forward cavity 109 through the dovetail root 82 of the blade 70 as illustrated in FIG. 6.

Referring to FIGS. 3 and 4, an annular turbine shroud stator 104 circumscribes the low pressure turbine blades. The shroud stator 104 has a seal land 106 preferably made of a honeycomb or similarly compliant material 107 bonded or otherwise fastened to a radially inwardly facing shroud surface of the seal land of the shroud stator 104. The seal teeth 92 and 94 are designed to seal against the honeycomb material 107 which is abradable and to minimize the amount of hot gas flowing the seal gap therebetween. The bleed air 160 in the cooling plenum 164 is also used for impingement cooling of the shroud stator 104.

An impingement cooling means for directing impingement cooling air 193 onto a radially outwardly facing side 190 of the shroud stator 104 and in one particular embodiment includes an impingement plenum 192 configured to receive bleed air 160 from the cooling plenum 164. Impingement cooling holes 194 a radially inward wall 198 of the impingement plenum 192 are used to direct the impingement cooling air 193 onto the radially outwardly facing side 190 of the shroud stator 104.

An external teeth cooling means 210 is also used for flowing the impingement cooling air 193 into the flowpath 89 and around the forward and aft seal teeth 92 and 94, respectively, after it has impinged on the radially outwardly facing side 190 of the shroud stator 104. One embodiment of the external teeth cooling means includes a leakage path 212 between a forward edge 214 of the shroud stator 104 and a support hanger 216 which supports the shroud stator 104 from the engine casing 14.

While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by letters patent of the United States is the invention as defined and differentiated in the following claims:

What is claimed is:

1. A gas turbine engine turbine blade shrouded tip comprising:
   an airfoil tip having a cross-sectional airfoil shape,
   a blade tip shroud attached to said tip,
   a shroud cooling circuit disposed within said blade tip shroud,
   said shroud cooling circuit including foward and aft pluralities of shroud cooling passages arranged for cooling substantially all of said shroud, and
   each of said forward and aft pluralities of said shroud cooling passages in fluid communication with a corresponding one of first and second cavities in a hollow interior of said tip.

2. A shrouded tip as claimed in claim 1 further comprising at least one circumferentially extending seal tooth on a radially outer shroud surface of said shroud, said tooth extending in a radial direction away from said hollow interior.

3. A shrouded tip as claimed in claim 1 wherein said shroud further comprises:
   circumferentially extending and axially spaced apart leading and trailing shroud edges,
   circumferentially spaced apart clockwise and counter-clockwise shroud side edges, and
   wherein said forward and aft pluralities of shroud cooling passages extend circumferentially between said clockwise and counter-clockwise shroud side edges.

4. A shrouded tip as claimed in claim 3 further comprising forward and aft ports in said tip shrouds, each of which is in fluid supply communication with a corresponding one of said forward and aft pluralities of said shroud cooling passages.

5. A shrouded tip as claimed in claim 1 further comprising at least one circumferentially extending seal tooth on a radially outer shroud surface of said shroud extending in a radial direction away from said hollow interior.

6. A shrouded tip as claimed in claim 5 wherein said shroud further comprises:
circumferentially extending and axially spaced apart leading and trailing shroud edges,
circumferentially spaced apart clockwise and counter-clockwise shroud side edges, and
said pluralities of said shroud cooling passages circumferentially extend between said clockwise and counter-clockwise shroud side edges.

7. A gas turbine engine turbine blade comprising:
an airfoil having an airfoil outer wall surrounding a hollow interior and extending radially outward from a blade platform to a tip shroud at an airfoil tip having an airfoil shape,
a shroud cooling circuit disposed within said blade tip shroud,
said shroud cooling circuit including cooling means for cooling substantially all of said shroud, and
said shroud cooling circuit further comprising forward and aft pluralities of shroud cooling passages, each of which is in fluid communication with a corresponding one of first and second cavities in said hollow interior.

8. A blade as claimed in claim 7 wherein said hollow interior includes at least one airfoil cooling circuit comprising at least in part said first and second cavities.

9. A blade as claimed in claim 8 further comprising at least one circumferentially extending seal tooth on a radially outer shroud surface of said shroud, said tooth extending in a radial direction away from said hollow interior.

10. A blade as claimed in claim 9 wherein said shroud further comprises:
circumferentially extending and axially spaced apart leading and trailing shroud edges,
circumferentially spaced apart clockwise and counter-clockwise shroud side edges, and
wherein said shroud cooling passages circumferentially extend between said clockwise and counter-clockwise shroud side edges.

11. A blade as claimed in claim 10 further comprising forward and apt ports in said tip shrouds, each of which is in fluid supply communication with a corresponding one of said forward and aft pluralities of said shroud cooling passages.

12. A blade as claimed in claim 7 wherein said airfoil has an aspect ratio of at least about 3.

13. A blade as claimed in claim 12 further comprising:
at least one circumferentially extending seal tooth on a radially outer shroud surface of said shroud, said tooth extending in a radial direction away from said hollow interior,
circumferentially extending and axially spaced apart leading and trailing shroud edges,
circumferentially spaced apart clockwise and counter-clockwise shroud side edges extending between said leading and trailing shroud edges, and
said shroud cooling passages circumferentially extend between said clockwise and counter-clockwise shroud side edges.

14. A blade as claimed in claim 13 further comprising forward and aft ports in said tip shrouds, each of which is in fluid supply communication with a corresponding one of said forward and aft pluralities of said shroud cooling passages.

15. A gas turbine engine turbine assembly comprising:
a turbine rotor having a plurality of turbine blades mounted around a periphery of said rotor,
said blades comprising; airfoils extending radially outward from blade platforms to tip shrouds at airfoil tips having airfoil shapes and mounted to said rotor by roots extending radially inward from said blade platforms,
said airfoils having airfoil outer walls surrounding hollow interiors,
circumferentially extending forward and aft seal teeth on radially outer shroud surfaces of said tip shrouds extending in a radial direction away from said hollow interiors across a flowpath,
shroud cooling circuits disposed through said tip shrouds and effective for cooling substantially all of said shroud,
said shroud cooling circuits comprising forward and aft pluralities of shroud cooling passages,
each of said forward and aft pluralities of said shroud cooling passages in fluid communication with corresponding ones of first and second cavities in said hollow interiors,
said first and second cavities in fluid communication with rotor cooling passages through said rotor, and
an annular sealing means mounted to and within an engine casing and spaced radially apart from said seal teeth so as to provide a gas path seal with said seal teeth.

16. An assembly as claimed in claim 15 further comprising at least one airfoil cooling circuit which includes said first and second cavities.

17. An assembly as claimed in claim 16 wherein each of said tip shrouds further comprises;
circumferentially extending and axially spaced apart leading and trailing shroud edges,
circumferentially spaced apart clockwise and counter-clockwise shroud side edges, and
wherein said pluralities of said shroud cooling passages circumferentially extend between said clockwise and counter-clockwise shroud side edges.

18. An assembly as claimed in claim 17 wherein said annular sealing means comprises a shroud stator supporting a honeycomb material mounted to a radially inwardly facing side of said shroud stator and said honeycomb material cooperates with said seal teeth so as to provide a gas path seal with said seal teeth.

19. An assembly as claimed in claim 18 further comprising impingement cooling means for directing impingement cooling air onto a radially outwardly facing side of said shroud stator.

20. An assembly as claimed in claim 19 further comprising external teeth cooling means for flowing the impingement cooling air into said flowpath and around said seal teeth after it has impinged said radially outwardly facing side of said shroud stator.

21. An assembly as claimed in claim 20 wherein said external teeth cooling means comprises a forward edge of said shroud stator, a support hanger which supports said shroud stator from said engine casing, and a leakage path between said forward edge of said shroud stator and said support hanger.

22. An assembly as claimed in claim 21 wherein said airfoils have aspect ratios of about at least 3.

* * * * *